United States Patent
Miya (10) Patent No.: US 6,684,086 B2
(45) Date of Patent: Jan. 27, 2004

(54) RADIO BASE STATION DEVICE AND RADIO COMMUNICATION METHOD

(75) Inventor: Kazuyuki Miya, Kawasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 9 days.

(21) Appl. No.: 09/890,939

(22) PCT Filed: Dec. 7, 2000

(86) PCT No.: PCT/JP00/08660
§ 371 (c)(1),
(2), (4) Date: Aug. 7, 2001

(87) PCT Pub. No.: WO01/43481
PCT Pub. Date: Jun. 14, 2001

(65) Prior Publication Data
US 2002/0160813 A1 Oct. 31, 2002

(30) Foreign Application Priority Data
Dec. 8, 1999 (JP) .......................................... 11-349465

(51) Int. Cl.[7] .................................................. H04Q 7/36
(52) U.S. Cl. ................. 455/562; 455/277.1; 455/277.2; 370/335; 370/342
(58) Field of Search .............................. 455/13.1, 33.1, 455/561, 562, 277.1, 277.2, 515, 516, 517; 370/335; 375/200, 145

(56) References Cited

U.S. PATENT DOCUMENTS

| | | | |
|---|---|---|---|
| 5,805,996 A | | 9/1998 | Salmela |
| 6,108,323 A | * | 8/2000 | Gray .......................... 370/335 |
| 6,115,609 A | | 9/2000 | Kim et al. |
| 6,310,871 B1 | | 10/2001 | Kim |
| 6,483,866 B1 | * | 11/2002 | Suzuki ........................ 375/149 |
| 2002/0002055 A1 | * | 1/2002 | Nitta ........................... 455/515 |
| 2002/0012331 A1 | * | 1/2002 | Takano ........................ 370/335 |

FOREIGN PATENT DOCUMENTS

| | | |
|---|---|---|
| EP | 0862343 | 9/1998 |
| EP | 0926843 | 6/1999 |
| JP | 08265837 | 10/1996 |
| JP | 10075481 | 3/1998 |
| JP | 11298954 | 10/1999 |
| KR | 1999-017204 | 3/1999 |
| KR | 1999-025060 | 4/1999 |
| WO | 9960809 | 11/1999 |

OTHER PUBLICATIONS

Supplementary European Search Report dated Aug. 8, 2002.
International Search Report dated Mar. 13, 2001.
Lan Chen, et al. "A Dynamic Channel Assignment Algorithm for Cellular System with Adaptive Array Antennas", VTC '99 Spring; 1999 IEEE.
Korean Office Action with English translation dated May 22, 2003.

* cited by examiner

Primary Examiner—Pablo N Tran
(74) Attorney, Agent, or Firm—Stevens, Davis, Miller & Mosher, LLP (57) ABSTRACT

Direction of arrival estimation sections 106a and 106b estimate directions of arrival for communication terminals. Grouping decision section 107 divides the communication terminals that belong to a sector into a plurality of groups based on the results of direction of arrival estimations. Scramble code assignment control section 114 performs assignment control in such a way that a same scramble code is assigned to channels with similar (not necessarily completely the same) directivities.

9 Claims, 8 Drawing Sheets

RADIO BASE STATION DEVICE AND RADIO COMMUNICATION METHOD

TECHNICAL FIELD

The present invention relates to a radio base station apparatus and radio communication method used in a digital radio communication system.

BACKGROUND ART

In a digital radio communication system, in the case where transmission with controlled directivity is performed on a downlink (downlink adaptive array antenna transmission), the number of sectors, which means areas where transmission/reception is performed with same directivity, is expected to reduce. That is, it is possible to achieve an effect similar to sectorization by carrying out transmission with directivity, which transmits data with beams focused on a specific direction through signal processing, and therefore applying transmission with directivity is believed to reduce the number of physical sectors.

Thus, the number of channels (number of user terminals) that can be accommodated per sector will increase by reducing the number of sectors through effects of reducing the number of sectors and applying an adaptive array antenna, that is, by enabling transmission with directivity to be performed through signal processing. When the number of channels that can be accommodated within a sector increases, concerns rise that there will inevitably be a shortage of spreading codes under a same scramble code on the downlink. To resolve this shortage of spreading codes, it is anticipated that a plurality of scramble codes will be used within the same sector.

Figure 1:
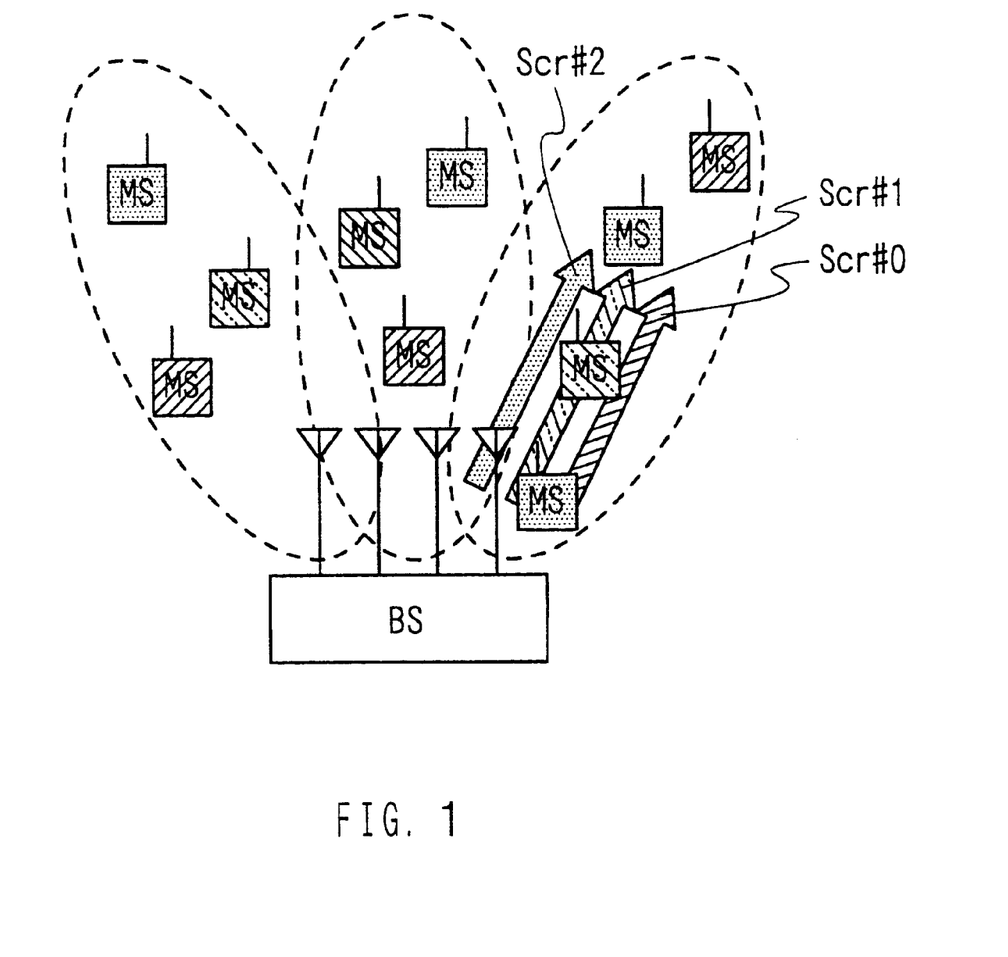
FIG. 1 is a drawing to explain a conventional radio communication method.

Conventionally, when a plurality of scramble codes is used within the same sector, the number of scramble codes is simply increased to resolve the shortage of spreading codes, and in this way scramble codes are assigned regardless of directivity of each channel. In such a case, as shown in FIG. 1, there is a possibility that different scramble codes #0 to #2 will be used among a plurality of channels in a same direction.

Originally, a same scramble code is used in a sector and transmission from a base station is carried out in synchronization therewith, and therefore orthogonality with no cross-correlation interference among codes can be expected. However, if scramble codes #0 to #2, which vary among a plurality of channels in a same direction, are used, the orthogonality can no longer be guaranteed (expected).

Thus, compared to a case where no adaptive array antenna is used, that is, the same scramble code is used for all channels within a sector, there will be a problem in reception at each communication terminal that cross-correlation interference from other channels occurs and the reception characteristic deteriorates.

DISCLOSURE OF INVENTION

It is an object of the present invention to provide a radio base station apparatus and radio communication method capable of reducing cross-correlation interference among a plurality of channels when a plurality of scramble codes is used within a same sector.

A subject of the present invention is to assign a same scramble code to channels with similar (not necessarily the same) directivities in a system that uses transmission with controlled directivity on a downlink (adaptive array antenna), thereby improve orthogonality among a plurality of channels in a same direction and reduce cross-correlation interference from other channels during reception from each communication terminal.

BEST MODE FOR CARRYING OUT THE INVENTION

With reference now to the attached drawings, embodiments of the present invention will be explained in detail below.

(Embodiment 1)

Figure 2:
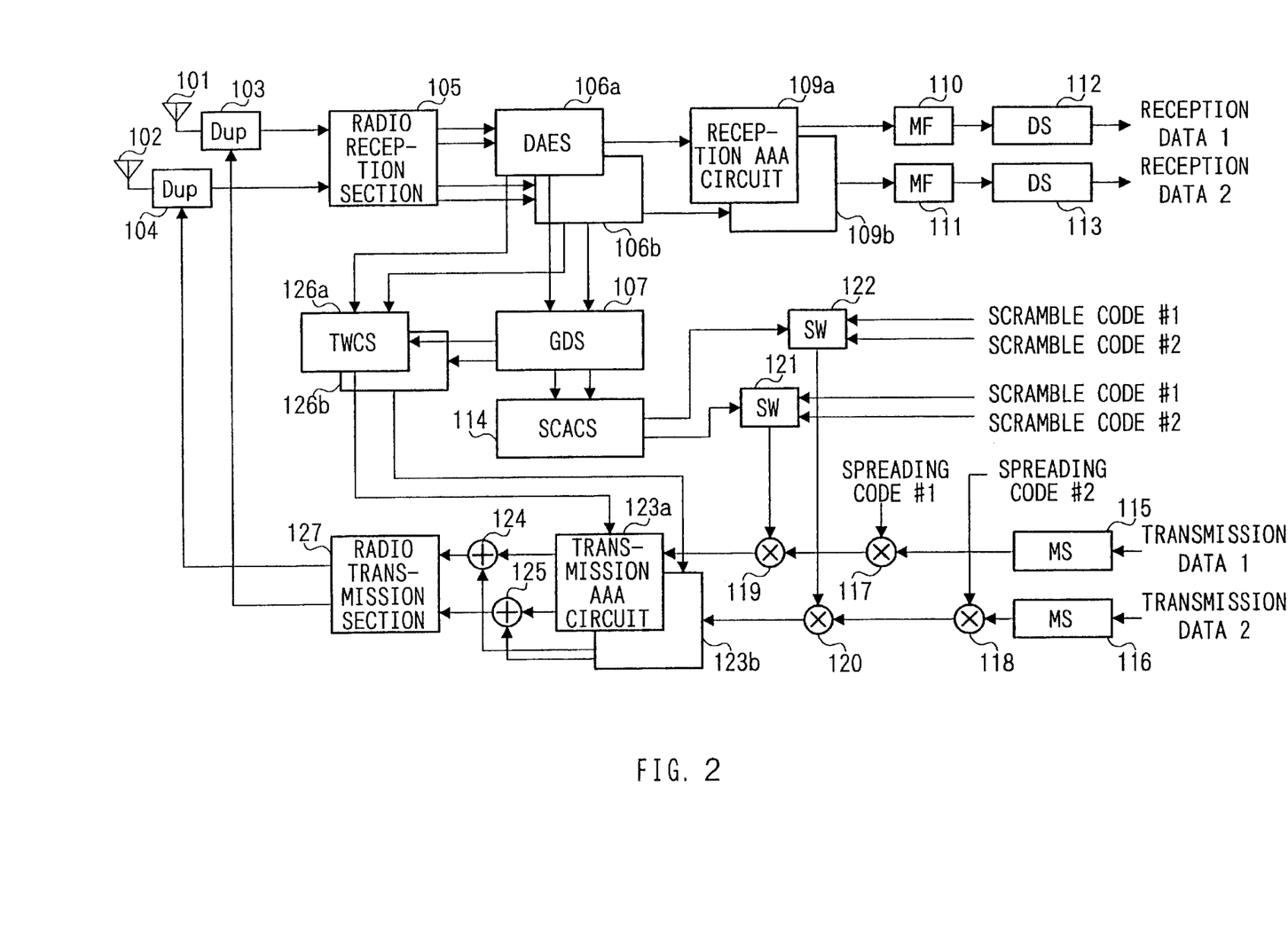
FIG. 2 is a block diagram showing a configuration of a radio base station apparatus according to Embodiment 1 of the present invention.

FIG. 2 is a block diagram showing a configuration of a radio base station apparatus according to Embodiment 1 of the present invention. Here, a case where a plurality of scramble codes is used in a same sector will be explained. For brevity of explanations, a case where the number of channels (number of users) is 2, the number of antennas is 2 and the number of scramble codes used is 2 will be explained.

Uplink signals received via antennas 101 and 102 are each passed through duplexers 103 and 104 and input to radio reception section 105. Radio reception section 105 applies radio reception processing such as down-conversion and A/D conversion to the reception signals to obtain baseband signals. These baseband signals are sent to direction of arrival estimation sections 106a and 106b, respectively and at the same time sent to reception adaptive array antenna (reception AAA) circuits 109a and 109b, respectively.

Direction of arrival estimation sections 106a and 106b estimate the directions of arrival of the reception signals of the respective channels (users). These direction of arrival estimation results are sent not only to grouping decision section 107 but also to transmission weight calculation sections 126a and 126b and reception AAA circuits 109a and 109b. Transmission weight calculation sections 126a and 126b calculate transmission weights based on the direction of arrival estimation results. These transmission weights are sent to transmission AAA circuits 123a and 123b for the respective channels (users).

Grouping decision section 107 decides groups that include terminals based on the direction of arrival estimation results. These decision results are sent to scramble code assignment control section 114.

Reception AAA circuits 109a and 109b apply reception AAA processing to the reception signals based on the direction of arrival estimation results from direction of arrival estimation sections 106a and 106b and output the signals subjected to the reception AAA processing to matched filters 110 and 111 for each reception directivity.

Matched filters 110 and 111 carry out despreadinq processing on the reception signals using a scramble code (Scr) and spreading code (Spr). The despread signals are sent to demodulation sections 112 and 113, respectively, where the despread signals are subjected to demodulation processing and reception data 1 and 2 are obtained.

On the other hand, the decision results (grouping results) from grouping decision section 107 are sent to scramble code assignment control section 114, where scramble codes are assigned to the respective groups according to the decision results. Then, scramble code assignment control signals are output to switches 121 and 122.

Transmission data 1 and 2 are subjected to digital modulation processing at modulation sections 115 and 116, respectively. These modulated transmission data are subjected to spreading/modulation processing with different spreading codes (Spr) #1 and #2 by multipliers 117 and 118, respectively. Furthermore, the transmission data multiplied by the spreading codes are subjected to modulation processing by multipliers 119 and 120 using scramble codes #1 and #2 assigned as described above.

These transmission data subjected to spreading/modulation processing are input to transmission AAA circuits 123a and 123b, respectively. Transmission AAA circuits 123a and 123b apply transmission processing to the transmission data using the transmission weights obtained by transmission weight calculation sections 126a and 126b using the respective direction of arrival estimation results.

The transmission data subjected to respective transmission AAA processing are multiplexed by multiplexers 124 and 125 for the respective antennas and sent to radio transmission section 127. Radio transmission section 127 carries out radio transmission processing such as D/A conversion and up-conversion on the transmission data. The transmission signals subjected to radio transmission processing are passed through duplexers 103 and 104 and sent via antennas 101 and 102 as downlink signals.

Then, the method of assigning scramble codes by the radio base station apparatus in the above configuration will be explained.

The signals sent from the respective communication terminals are subjected to predetermined radio reception procession at radio reception section 105 and then subjected to direction of arrival estimation processing at direction of arrival estimation sections 106a and 106b, respectively. There are various direction of arrival estimation methods such as a beam former method using FFT (Fast Fourier Transform), linear prediction method and minimum norm method, but the present invention is not limited to a particular method.

After direction of arrival estimation sections 106a and 106b have performed direction of arrival estimation on the respective communication terminals, the estimation results are sent to grouping decision section 107. Grouping decision section 107 divides communication terminals that belong to the sector into at least two groups based on the direction of arrival estimation result.

Figure 3:
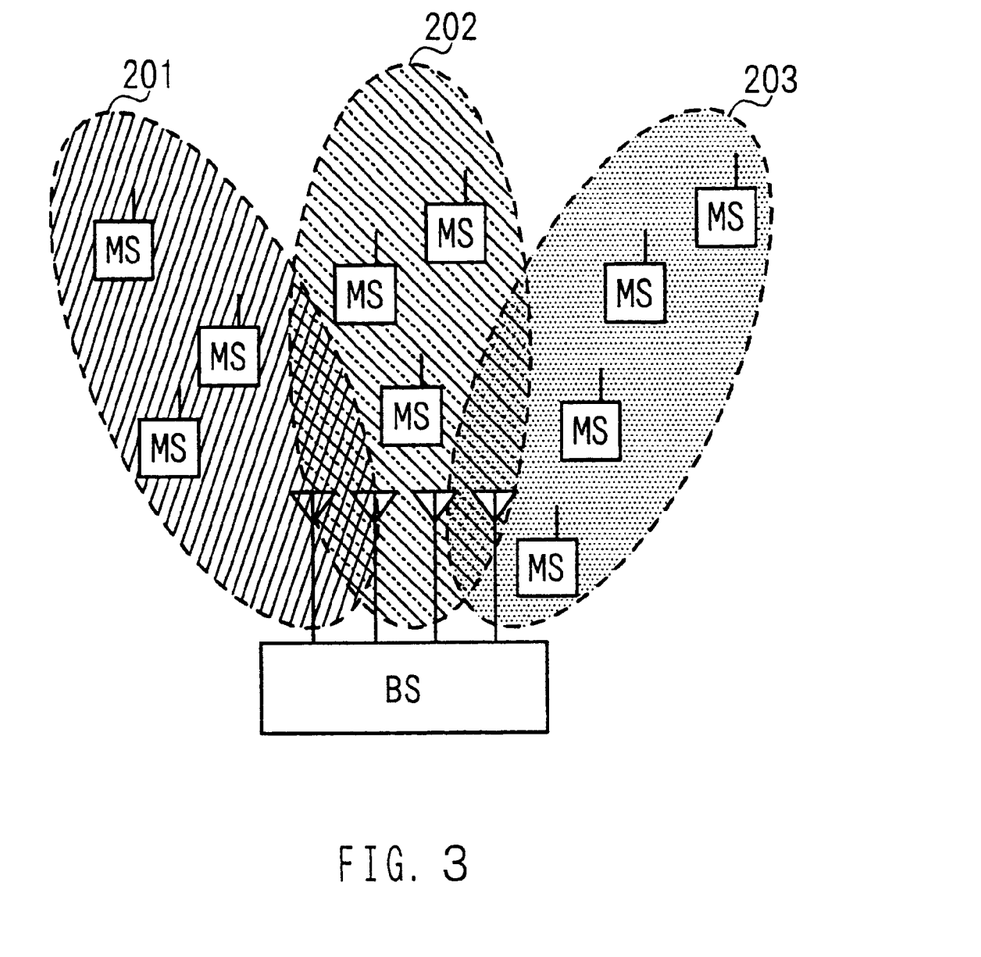
FIG. 3 is a drawing to explain a radio communication method according to Embodiment 1 above.

An example of grouping method is that directions of arrival of respective communication terminals are divided into predetermined angle range groups and grouping is performed by deciding which communication terminal belongs to which angle range. The predetermined angle ranges for grouping are set, for example, relative to the antenna direction of the present radio base station apparatus. For example, when the communication terminals that belong to the sector are divided into three groups according to the directions of arrival, three angle ranges are set beforehand as shown in FIG. 3 and groups 201 to 203 are formed according to which communication terminal belongs to which angle range.

The decision results of grouping decision section 107, that is, the information on which communication terminal belongs to which angle range (group) are sent to scramble code assignment control section 114. Scramble code assignment control section 114 performs assignment control in such a way that a same scramble code is assigned to channels with similar (not necessarily completely the same) directivities.

In this case, as described above groups are set in such a way as to include channels with similar directivities based on the direction of arrival estimations. Therefore, by assigning a scramble code to each group, it is possible to assign a same scramble code to communication terminals (channels) with similar (not necessarily completely the same) directivities.

These assignment control signals are sent to switches 121 and 122, where the scramble codes are switched. Then, the scramble codes assigned to the respective groups are used for the downlink signals of communication terminals that belong to the respective groups.

For example, when grouping decision section 107 decides based on the directions of arrival that communication terminals A to G belong to group 1 and communication terminals H to K belong to group 2, scramble code #1 is assigned to group 1 and scramble code #2 is assigned to group 2. In this case, scramble code #1 is used for all the downlink signals corresponding to communication terminals A to G and scramble code #2 is used for all the downlink signals corresponding to communication terminals H to K.

On the other hand, the direction of arrival estimation results are sent to reception AAA circuits 109a and 109b, where reception weights are calculated using the direction of arrival estimation results and reception directivities are formed according to these reception weights. Then, reception AAA circuits 109a and 109b perform reception AAA processing on the reception signals with these reception directivities.

Furthermore, the direction of arrival estimation results estimated at direction of arrival estimation sections 106a and 106b are sent to transmission weight calculation sections 126a and 126b, where transmission weights specific to the respective communication terminals are calculated. Transmission directivities are formed according to these transmission weights. Then, transmission AAA circuits 123a and 123b perform transmission AAA processing with these transmission directivities specific to the respective communication terminals. The transmission signals of the respective communication terminals subjected to transmission AAA processing are multiplexed by adders 124 and 125 for the respective antennas, subjected to processing such as D/A conversion and up-conversion at radio transmission section 127 and then sent with directivities from antennas 101 and 102.

As shown above, in a system that applies transmission with controlled directivities on the downlink (adaptive array antenna), the radio base station apparatus according to this embodiment groups communication terminals having similar directivities based on the directions of arrival of the communication terminals and assigns a same scramble code to all communication terminals that belong to the group. This makes it possible to improve orthogonality among codes of downlink signals corresponding to the communication terminals that belong to the same group. This reduces cross-correlation interference from other channels during reception from the respective communication terminals.

When downlink signals are transmitted with directivities, this embodiment can also perform directivity control over the respective communication terminals individually or group the communication terminals and perform same directivity control over communication terminals that belong to a same group. In this case, as shown in FIG. 2, group information decided by grouping decision section 107 based on the direction of arrival estimation results from direction of arrival estimation sections 106a and 106b is output to transmission weight calculation sections 126a and 126b and transmission weight calculation sections 126a and 126b perform directivity control according to the group information for each group. Carrying out transmission directivity control on a group-by-group basis in this way can simplify processing for directivity control.

On the other hand, in the configuration of the reception section, matched filters 110 and 111 can also be provided before direction of arrival estimation sections 106a and 106b or reception AAA circuits 109a and 109b. That is, direction of arrival estimations or AAA processing can also be carried out on the signals after despreading processing. Moreover, direction of arrival estimations or AAA processing can also be carried out independently of each other and with different algorithms. In the present invention, reception AAA processing is not regarded as essential.

(Embodiment 2)

This embodiment describes a case where downlink signals are individually subjected to directivity control and when a group weight is applied to uplink signals, communication terminals with almost a same directivity are grouped using the group weight and a scramble code is assigned to each group.

Figure 4:
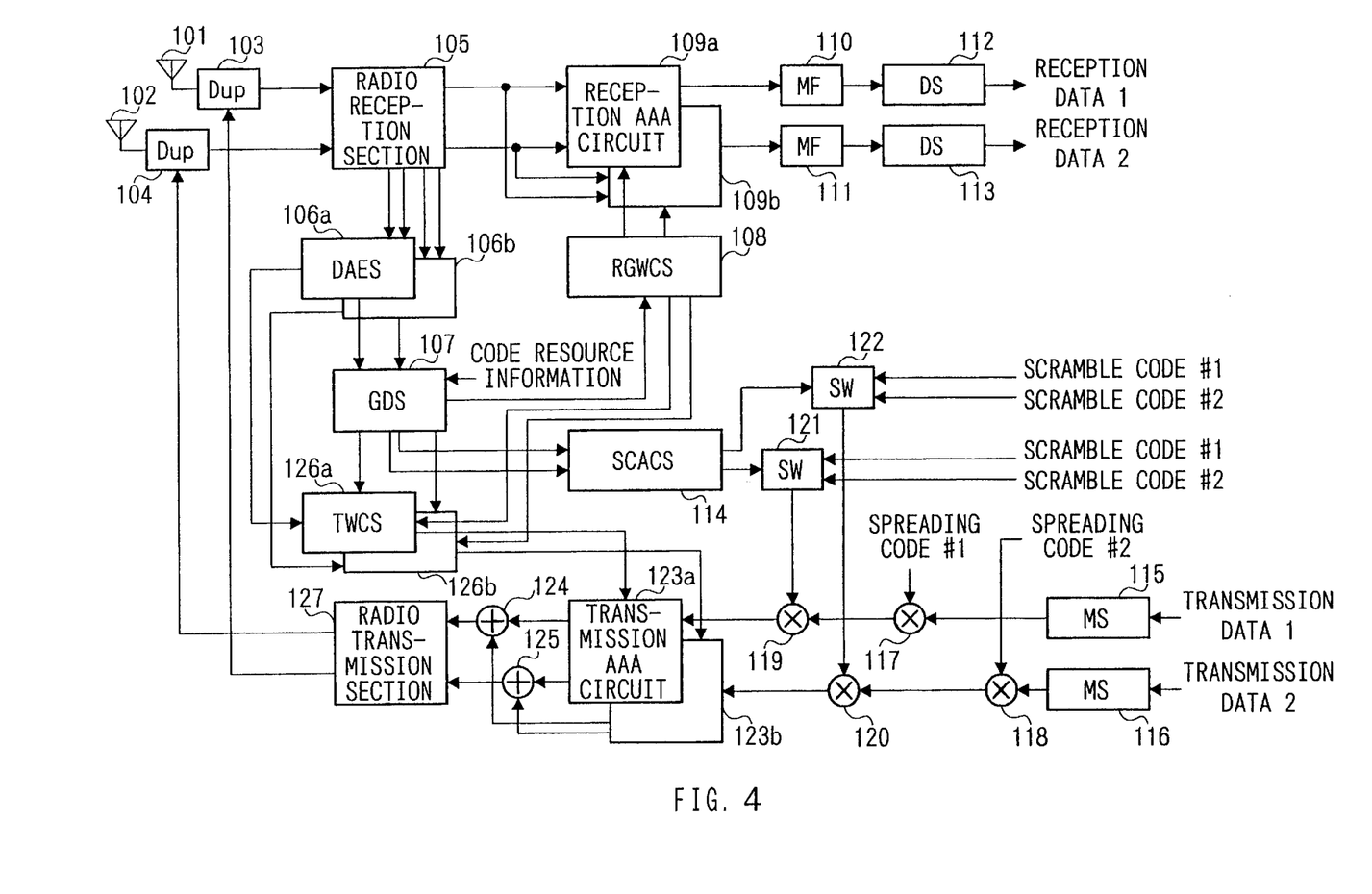
FIG. 4 is a block diagram showing a configuration of a radio base station apparatus according to Embodiment 2 of the present invention.

FIG. 4 is a block diagram showing a configuration of a radio base station apparatus according to Embodiment 2 of the present invention. By the way, in FIG. 4, the same parts as those in FIG. 2 are assigned the same reference numerals as those in FIG. 2.

Uplink signals received via antennas 101 and 102 are passed through duplexers 103 and 104 and input to radio reception section 105. Radio reception section 105 applies radio reception processing such as down-conversion and A/D conversion to the reception signals to obtain baseband signals. These baseband signals are sent to direction of arrival estimation sections 106a and 106b, respectively and at the same time sent to reception adaptive array antenna (reception AAA) circuits 109a and 109b, respectively.

Direction of arrival estimation sections 106a and 106b estimate the directions of arrival of the reception signals of the respective channels (users). These direction of arrival estimation results are sent not only to grouping decision section 107 but also to transmission weight calculation sections 126a and 126b. Transmission weight calculation sections 126a and 126b calculate transmission weights based on the direction of arrival estimation results. These transmission weights are sent to transmission AAA circuits 123a and 123b for the respective channels (users).

Grouping decision section 107 decides groups that include terminals based on the direction of arrival estimation results. These decision results are sent to reception group weight calculation section 108 and at the same time sent to scramble code assignment control section 114.

Reception group weight calculation section 108 calculates a reception group weight for each group decided and sends these reception group weights to reception AAA circuits 109a and 109b for the respective groups. Reception AAA circuits 109a and 109b apply reception AAA processing to the reception signals and output the signals subjected to the reception AAA processing to matched filters 110 and 111 for the respective reception directivities.

Matched filters 110 and 111 carry out despreading processing on the reception signals using a scramble code (Scr) and spreading code (Spr). The despread signals are sent to demodulation sections 112 and 113, respectively, where the despread signals are subjected to demodulation processing and reception data 1 and 2 are obtained.

On the other hand, the decision results (grouping results) from grouping decision section 107 are sent to scramble code assignment control section 114, where scramble codes are assigned to the respective groups according to the decision results. Then, scramble code assignment control signals are output to switches 121 and 122.

Transmission data 1 and 2 are subjected to digital modulation processing at modulation sections 115 and 116, respectively. These modulated transmission data are subjected to spreading/modulation processing with different spreading codes (Spr) #1 and #2 by multipliers 117 and 118, respectively. Furthermore, the transmission data items multiplied by the spreading codes are subjected to modulation processing at multipliers 119 and 120 using scramble codes #1 and #2 assigned as described above.

These transmission data items subjected to spreading/modulation processing are input to transmission AAA circuits 123a and 123b, respectively. Transmission AAA circuits 123a and 123b apply transmission AAA processing to the transmission data using the transmission weights obtained by transmission weight calculation sections 126a and 126b using the respective direction of arrival estimation results.

The transmission data items subjected to respective transmission AAA processing are multiplexed for the respective antennas by multiplexers 124 and 125 and sent to radio transmission section 127. Radio transmission section 127 carries out radio transmission processing such as D/A conversion and up-conversion on the transmission data. The transmission signals subjected to radio transmission processing are passed through duplexers 103 and 104 and sent via antennas 101 and 102 as downlink signals.

Then, the method of assigning scramble codes by the radio base station apparatus in the above configuration will be explained.

The signals sent from the respective communication terminals are subjected to predetermined radio reception procession at radio reception section 105 and then subjected to direction of arrival estimation processing at direction of arrival estimation sections 106a and 106b, respectively. There are various direction of arrival estimation methods such as a beam former method using FFT (Fast Fourier Transform), linear prediction method and minimum norm method, but the present invention is not limited to a particular method.

Once direction of arrival estimation sections 106a and 106b have performed direction of arrival estimation on the respective communication terminals, the estimation results are sent to grouping decision section 107. Grouping decision section 107 divides communication terminals that belong to the sector into at least two groups based on the direction of arrival estimation results. The grouping method is the same as that in Embodiment 1. By the way, grouping decision section 107 can be used commonly for the calculation of reception group weight of the uplink signals and the assignment of scramble codes of the downlink signals.

The decision result of grouping decision section 107, that is, the information on which communication terminal belongs to which angle range (group) is sent to scramble code assignment control section 114. Scramble code assignment control section 114 performs assignment control in such a way that a same scramble code is assigned to channels with similar (not necessarily completely the same) directivities.

The grouping decision result may be directly used for the assignment of scramble codes or may be used for assignment of scramble codes in such a way that communication terminals are re-grouped taking into account the number of spreading codes (code resource) used for the downlink signals based on the grouping decision result.

As described above, groups are set so as to include channels with similar directivities based on direction of arrival estimations. Therefore, by assigning a scramble code to each group, it is possible to assign a same scramble code to communication terminals (channels) with similar (not necessarily completely the same) directivities.

These assignment control signals are sent to switches 121 and 122, where the scramble codes are switched. Then, the scramble codes assigned to the respective groups are used for the downlink signals of communication terminals that belong to the respective groups.

On the other hand, information from grouping decision section 107 (e.g., angle range information) is sent to group weight calculation section 108, where group-specific reception weights are calculated. Reception directivities are formed according to these reception weights. Then, reception AAA circuits 109a and 109b perform reception AAA processing with these group-specific reception directivities.

On the other hand, the direction of arrival estimation results of direction of arrival estimation circuits 109a and 109b are sent to transmission weight calculation sections 126a and 126b, where transmission weights for the respective communication terminals are calculated. Transmission directivities are formed according to these transmission weights. Then, transmission AAA circuits 123a and 123b perform transmission AAA processing with these transmission directivities for the respective communication terminals.

By the way, it is possible to perform adaptive signal processing at reception group weight calculation section 108 using an algorithm such as LMS (Least Means Square) or RLS (Recursive Least Squares).

As shown above, when group weights are used for the uplink signals in a system that uses transmission with directivities controlled on the downlink (adaptive array antenna), the radio base station apparatus according to this embodiment groups communication terminals having similar directivities based on the directions of arrival from the communication terminals and assigns a same scramble code to all the communication terminals that belong to the group. This improves orthogonality among codes of downlink signals corresponding to the communication terminals that belong to the group. This allows cross-correlation interference from other channels during reception of the respective communication terminals to be reduced. Moreover, it is also possible to use grouping decision results to calculate group weights of uplink signals, which can simplify processing of assigning scramble codes. As a result, it is possible to reduce processing load on the radio base station apparatus.

When the number of spreading codes (code resource) used for downlink signals is not enough, the explanations above relate to the use of the group decision result obtained by the calculation of group weights for the uplink signals. This control is performed taking into account the number of spreading codes (code resource) used for downlink signals as appropriate. That is, when the number of spreading codes is not enough, scrambling codes are assigned using the group decision result obtained in the calculation of group weights for the uplink signals as shown above and when the number of spreading codes is enough, grouping decision section 107 performs re-grouping processing and assigns scrambling codes according to the decision result. That is, when the number of spreading codes used for the downlink signals is enough, grouping decision section 107 performs processing of assigning a same scramble code to a plurality of groups or carrying out grouping using the number of terminals (number of channels) within a range that no shortage of spreading codes is produced as a maximum value.

In this case, as shown in FIG. 4, grouping decision section 107 selects whether the grouping decision result for the reception group weight should be directly used for scramble code assignment control or the grouping decision result should not be used or grouping processing should be done over, according to the code resource information.

For example, this can be explained based on the code resource information using FIG. 3. In the case where there is no shortage of code resource according to the code resource information, grouping decision section 107 sends a control signal indicating that no grouping decision result will be used to scramble code assignment control section 114 and scramble code assignment control section 114 assigns a same scramble code to all groups 201 to 203. Or in the case where there is no shortage of code resources, grouping decision section 107 does over grouping processing and performs grouping into group 202, 203 and group 201. Then, grouping decision section 107 sends the re-grouping decision result to scramble code assignment control section 114, where a same scramble code #0 is assigned to the communication terminals that belong to groups 202 and 203 and a different scramble code #1 is assigned to the communication terminal that belongs to group 201. On the other hand, in the case where there is a shortage of code resources according to the code resource information, a same scramble code is assigned to each group using the grouping decision result for the reception group weights as described above.

In the respect of reception AAA regarding uplink signals, group 202 and group 203 have quite different directivities, and therefore it is better from the standpoint of the reception characteristic to distinguish and receive those signals as signals that belong to different groups. This respect is independent of the number of terminals in each group. On the other hand, for downlink signals, it depends on the number of terminals whether a same scramble code should be assigned to these group 202 and group 203. Therefore, if there is no shortage of spreading codes, assigning a same scramble code to group 202 and group 203 will improve orthogonality and will be advantageous from the standpoint of reducing cross-correlation interference.

Therefore, when group weights are used for uplink signals in a system that uses transmission with controlled directivities on the downlink, it is possible to improve the reception characteristic by carrying out grouping decision and changing scramble code assignment control based on the code resource information, and reduce cross-correlation interference from other channels during reception from the respective communication terminals as well.

When downlink signals are transmitted with directivity, this embodiment can perform directivity control to the respective communication terminals individually as described above or can divide the respective communication terminals into groups and perform control with a same directivity on communication terminals that belong to a same group.

In this case, as shown in FIG. 4, grouping decision section 107 decides group information based on the direction of arrival estimation results from direction of arrival estimation sections 106a and 106b and outputs the decided group information to transmission weight calculation sections 126a and 126b and transmission weight calculation sections 126a and 126b perform directivity control for each group according to the group information. On the other hand, the reception group weights obtained from the group information decided by grouping decision section 107 are output to transmission weight calculation sections 126a and 126b and transmission weight calculation sections 126a and 126b perform directivity control for each group according to the group information.

As shown above, by carrying out transmission directivity control for each group, it is possible to simplify directivity control processing.

(Embodiment 3)

Figure 5:
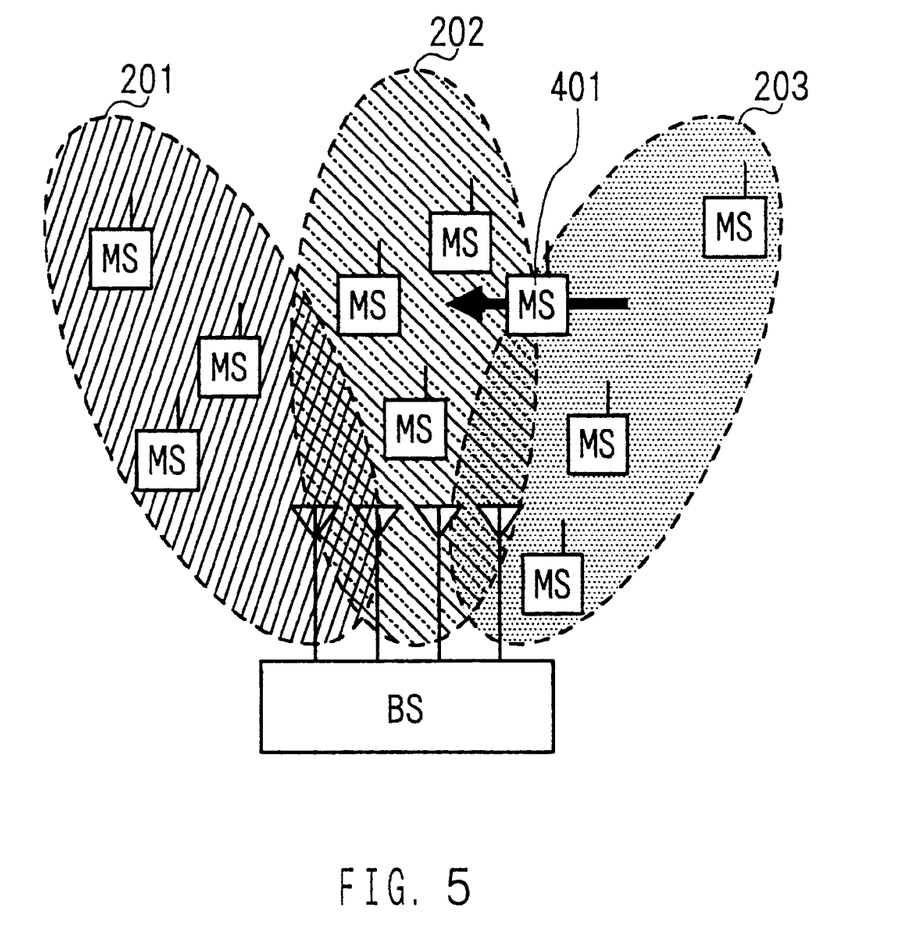
FIG. 5 is a drawing to explain a radio communication method according to Embodiment 3 of the present invention.

As shown in FIG. 5, this embodiment describes a case where scramble codes are changed within a same sector when communication terminal 401 moves across different groups.

Figure 6:
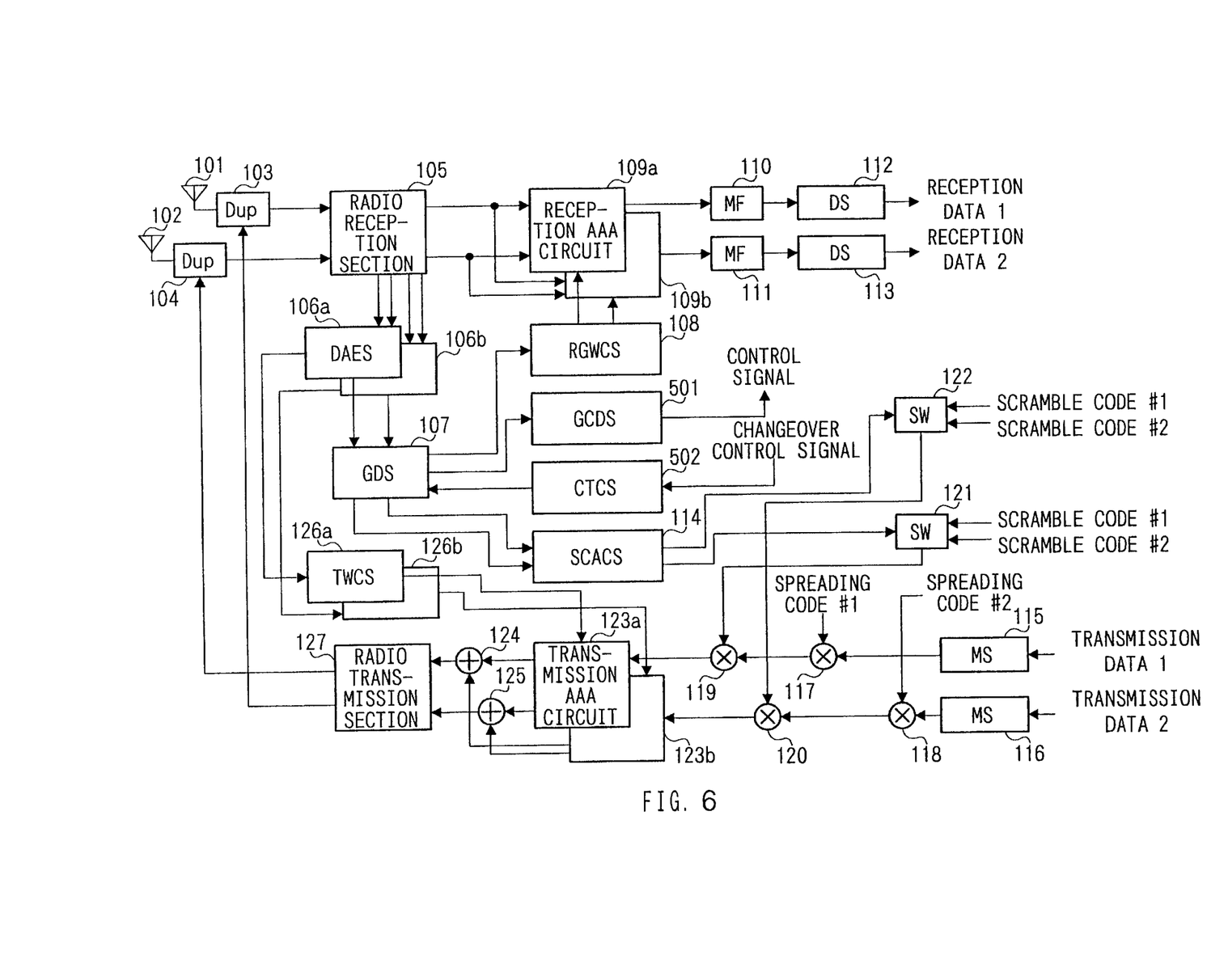
FIG. 6 is a block diagram showing a configuration of a radio base station apparatus according to Embodiment 3 above.

FIG. 6 is a block diagram showing a configuration of a radio base station apparatus according to Embodiment 3 of the present invention. In FIG. 6, the same parts as those in FIG. 2 are assigned the same reference numerals as those in FIG. 2 and detailed explanations thereof will be omitted.

The radio base station apparatus includes group changeover decision section 501 that decides whether or not to change a group when a change takes place in set grouping as a communication terminal moves and changeover timing control section 502 that controls the changeover timing.

In the radio base station apparatus configured as shown above, a case where the communication terminal moves and a group changeover is made will be explained. First, the directions of arrival of reception signals of the respective communication terminals are estimated. The method of estimating the directions of arrival is the same as that in Embodiment 1.

Next, grouping decision section 107 is monitoring the directions of arrival and when a group changeover takes place with a communication terminal, grouping decision section 107 sends a signal indicating that the group will be changed to group change over decision section 501. Upon reception of the signal that the group will be changed, group changeover decision section 501 sends a control signal to an upper layer to negotiate with the communication terminal whose group is changed.

Then, the information that the scramble code will be changed is notified to the communication terminal whose group is to be changed through the upper layer. The upper layer then sends a changeover control signal indicating that a changeover between scramble codes is allowed to changeover timing control section 502. Upon reception of the changeover control signal, changeover timing control section 502 sends a control signal to grouping decision section 107 to instruct the changeover timing. Grouping decision section 107 updates the group to which the communication terminal above belongs based on the changeover timing above. That is, grouping decision section 107 updates the group to which communication terminal 401 belongs from group 203 to group 202.

The information updated by grouping decision section 107, that is, the group information indicating which communication terminal belongs to which angle range (group) is sent to scramble code assignment control section 114. Scramble code assignment control section 114 performs assignment control in such a way that a same scramble code is assigned to channels with almost identical directivities in the same way as in Embodiment 1.

By the way, the operation of calculating transmission weights from the direction of arrival estimation results and performing transmission AAA processing on transmission data with the transmission weights and the operation of calculating reception group weights based on the grouping decision results and performing reception AAA processing on reception signals using the reception group weights are the same as those in Embodiment 1.

As shown above, this embodiment can assign a same scramble code to channels with almost identical directivities also when the communication terminal moves and a change takes place to the group and thereby improve orthogonality among codes of downlink signals for communication terminals with almost identical directivities. This makes it possible to reduce cross-correlation interference from other channels during reception from each communication terminal.

(Embodiment 4)

This embodiment describes a case where assignment of scramble codes according to the present invention is performed when signals are transmitted by combining channels carrying out transmission with no directivity and channels carrying out transmission with directivity.

Figure 7:
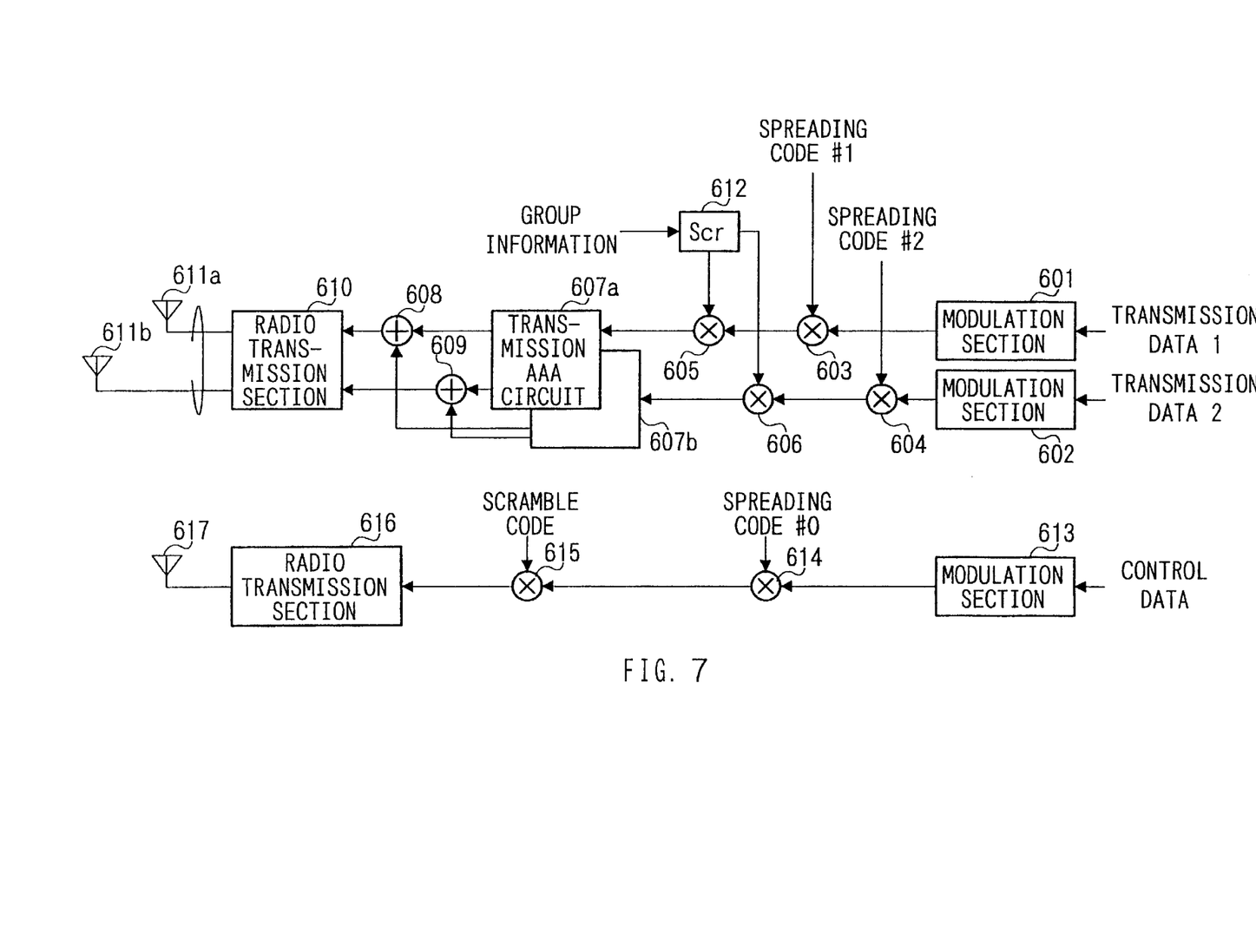
FIG. 7 is a block diagram showing a configuration of a radio base station apparatus according to Embodiment 4 of the present invention.

FIG. 7 is a block diagram showing a configuration of a radio base station apparatus according to Embodiment 4 of the present invention. By the way, FIG. 7 only describes the transmitting side. The receiving side of this radio base station apparatus has the same configuration as those shown in FIG. 2, FIG. 4 and FIG. 6.

Transmission data 1 and 2, which are communication channels of voice signals and packet signals are subjected to digital modulation processing at modulation sections 601 and 602. These transmission data subjected to modulation processing are subjected to spreading modulation processing using different spreading codes (Spr) #1 and #2 at multipliers 603 and 604, respectively. These transmission data multiplied by the respective codes are subjected to modulation processing at multipliers 605 and 606 using scramble codes assigned by scramble code assignment control section 612.

The transmission data subjected to modulation processing in this way are input to transmission AAA circuits 607a and 607b, respectively. Transmission AAA circuits 607a and 607b perform transmission AAA processing on the transmission data with the transmission weights obtained using the direction of arrival estimation results, etc.

The transmission data subjected to transmission AAA processing are multiplexed by multiplexers 608 and 609 for the respective antennas and sent to radio transmission section 610. Radio transmission section 610 carries out radio transmission processing such as D/A conversion and up-conversion on the transmission data. The transmission signals subjected to radio transmission processing are transmitted as downlink signals via antennas 611a and 611b, which make up an adaptive array antenna.

On the other hand, the control data, which is a common control channel signal that carries out transmission with no directivity is subjected to digital modulation processing by modulation section 613. This transmission data subjected to modulation processing is subjected to spreading/modulation processing with spreading code (Spr) #0 by multiplier 614. Furthermore, the transmission data multiplied by the spreading code is subjected to modulation processing using scramble code #0 by multiplier 615.

The transmission data subjected to spreading/modulation processing in this way is sent to radio transmission section 616. Radio transmission section 616 carries out radio transmission processing such as D/A conversion and up-conversion on the transmission data. The transmission signal subjected to radio transmission processing is transmitted as a downlink signal via antenna 617 making up an adaptive array antenna.

The scramble code assignment control at the radio base station apparatus in the above configuration will be explained.

First, the directions of arrival of reception signals of the respective communication terminals are estimated. The method of estimating directions of arrival is the same as that in Embodiment 1. Then, communication terminals within a same sector are grouped based on the directions of arrival of the respective communication terminals. This grouping information, that is, the group information indicating which communication terminal belongs to which angle range (group) is sent to scramble code assignment control section 612. Scramble code assignment control section 612 performs assignment control in such a way that a same scramble code is assigned to channels with almost identical directivities in the same way as in Embodiment 1. In this case, assignment control is performed taking into account orthogonality with the common control channel signal transmitted with no directivity.

More specifically, when transmission with no directivity is combined with transmission with directivity, directivities are formed as shown in FIG. 7. Here, if scramble codes are changed between a channel for transmission with no directivity (e.g., a common control channel) and a channel for transmission with directivity (e.g., a communication channel), it is impossible to guarantee orthogonality between the channel for transmission with no directivity and channel for transmission with directivity and cross-correlation interference occurs from each other's channel, thus deteriorating the reception characteristic.

Figure 8:
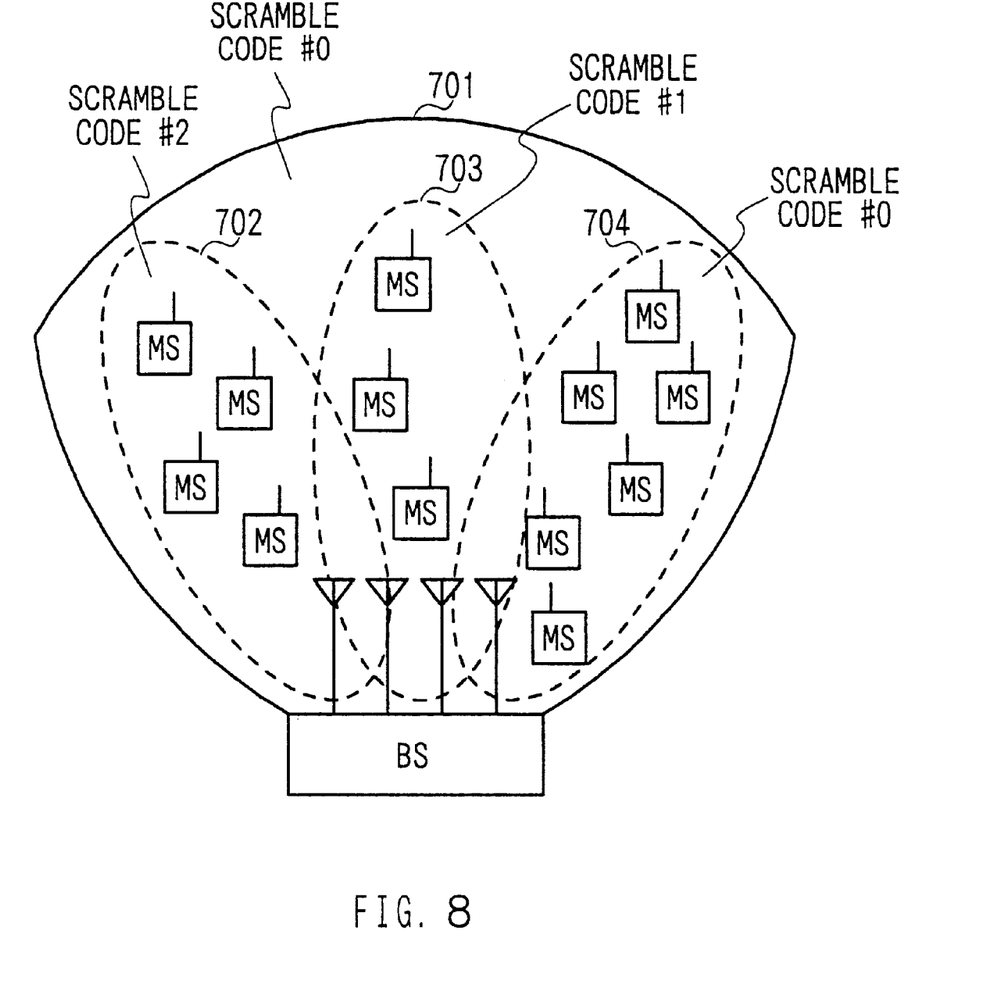
FIG. 8 is a drawing to explain a radio communication method according to Embodiment 4 above.

Thus, scramble code assignment control section 612 performs control in such a way that a scramble code set for a channel carrying out transmission with no directivity is selected and assigned to at least one (here one) group that carries out transmission with directivity. For example, scramble code assignment control section 612 actually performs control in such a way that a scramble code set for a channel carrying out transmission with no directivity is selected and assigned to a group with the largest number of channels (number of users), that is, group to which the most communication terminals belong. More specifically, as shown in FIG. 8, when scramble code #0 is set in the channel for transmission with no directivity in sector 701, scramble code #0 is assigned to group 704 to which the most communication terminals belong. Other scramble codes #1 and #2 are assigned to other groups 702 and 703, respectively.

By assigning scramble codes #0 to #2 in this way, it is possible to reduce cross-correlation interference from other channels for as many communication terminals as possible. In this case, it is desirable that there be conditions that will not cause a shortage of codes.

Or when transmission with no directivity is combined with transmission with directivity, it is also possible to give up orthogonality between the channel for transmission with no directivity and the channel for transmission with directivity and assign a scramble code different from the scramble code used for the channel for transmission with no directivity to the channel for transmission with directivity for each group in the same way as in Embodiment 1.

Furthermore, when transmission with no directivity is combined with transmission with directivity, the antenna for transmission with no directivity is separated from the antenna for transmission with directivity, but these need not always be separated and it is also possible to carry out transmission with no directivity using the antenna for transmission with directivity.

By the way, the operation of calculating transmission weights from the direction of arrival estimation results and performing transmission AAA processing on transmission data with the transmission weights and the operation of calculating reception group weights based on the grouping decision results and performing reception AAA processing on reception signals with the reception group weights are the same as those in Embodiment 1.

Embodiments 1 to 4 above can be implemented by combining with one another as appropriate. The present invention is not limited to Embodiments 1 to 4 above, but can be implemented with various modifications. For example, Embodiments 1 to 4 above describe the case where there are two or three antennas and two scramble codes, but the present invention is also applicable to cases where there are 3 or more scramble codes and 4 or more antennas.

Embodiments 1 to 4 above describe the case where reception signals are subjected to reception AAA processing and then despreading processing, but the present invention is also applicable to a case where reception AAA processing is carried out on signals subjected to despread processing.

The radio base station apparatus of the present invention comprises a direction of arrival estimation section that estimates directions of arrival of reception signals from communication terminals, a division section that divides the respective communication terminals into groups based on the directions of arrival, a scramble code assignment control section that assigns scramble codes differing from one group to another and a transmission section that performs transmission with directivity of transmission signals modulated using the assigned scramble codes to the respective communication terminals.

In a system that applies transmission with controlled directivity on the downlink (adaptive array antenna), this configuration divides the communication terminals having similar directivities into groups based on the directions of arrival of the communication terminals and assigns a same scramble code to all communication terminals that belong to the group, and can thereby improve orthogonality among codes of downlink signals with respect to the communication terminals that belong to a same group. This makes it possible to reduce cross-correlation interference from other channels during reception from the respective communication terminals.

The radio base station apparatus of the present invention in the above configuration adopts a configuration with the dividing means dividing the communication terminals into groups based on the directions of arrival in transmission to the communication terminals.

According to this configuration, it is possible to group a plurality of channels (users) of the uplink signals and unify the grouping to determine a group weight to carry out reception with directivity using a common weight within a same group (hereinafter referred to as "group weight") and the grouping for scramble code assignment, which simplifies processing to assign scramble codes when transmission with group directivity is performed on the uplink.

The radio base station apparatus of the present invention configured as shown above adopts a configuration with the division section carrying out re-dividing processing based on code resource information.

By changing grouping decision and scramble code assignment control based on the code resource information when group weights are used for uplink signals, this configuration can improve the reception characteristic and reduce cross-correlation interference from other channels during reception from each communication terminal as well.

The radio base station apparatus of the present invention configured as shown above adopts a configuration comprising a notification section that notifies, when a communication terminal changes the group as it moves, the communication terminal that the scramble code will be changed, a changeover timing control section that controls timing to change the scramble code, wherein the scramble code assignment control section assigns scramble codes after the changeover to the communication terminal whose group has been changed due to the movement.

This configuration makes it possible to accurately assign a same scramble code to channels with almost identical directivities even if the communication terminal moves and changes the group, and improve orthogonality among codes of downlink signals with respect to the communication terminals with almost identical directivities. This can reduce cross-correlation interference from other channels during reception from the respective communication terminals.

The radio base station apparatus of the present invention configured as shown above adopts a configuration with the scramble code assignment control section carrying out assignment control in such a way that a scramble code set in at least one of channels carrying out transmission with directivity matches the scramble code set in channels carrying out transmission with no directivity.

The radio base station apparatus of the present invention configured as shown above adopts a configuration with the scramble code assignment control section assigning the same scramble code as the scramble code set in channels carrying out transmission with no directivity to a group to which the most communication terminals belong.

This configuration can reduce cross-correlation interference from other channels for as many communication terminals as possible.

The communication terminal apparatus of the present invention is characterized by carrying out radio communication with the radio base station apparatus in the above configuration. This guarantees orthogonality of a plurality of scramble downlink signals even if a plurality of scramble codes is used within a same sector, preventing the reception characteristic from deteriorating.

The radio communication method of the present invention comprises a direction of arrival estimating step of estimating directions of arrival of reception signals from communication terminals, a dividing step of dividing the communication terminals into groups based on the directions of arrival, a scramble code assignment controlling step of assigning scramble codes differing from one group to another and a transmitting step of transmitting transmission signals modulated using the assigned scramble codes to the communication terminals with directivity.

In a system that applies transmission with controlled directivity on the downlink (adaptive array antenna), this method divides the communication terminals having similar directivities into groups based on the directions of arrival of the communication terminals and assigns a same scramble code to all communication terminals that belong to the group, and can thereby improve orthogonality among codes of downlink signals with respect to the communication terminals that belong to a same group. This makes it possible to reduce cross-correlation interference from other channels during reception from the respective communication terminals.

The radio communication method above of the present invention comprises a notification step of notifying, when a communication terminal changes the group as it moves, the communication terminal that the scramble code will be changed, a changeover timing controlling step of controlling timing to change the scramble code, wherein the scramble code assignment controlling step assigns scramble codes after the changeover to the communication terminal whose group has been changed due to the movement.

This method makes it possible to accurately assign a same scramble code to channels with almost identical directivities even if the communication terminal moves and changes the group and improve orthogonality among codes of downlink signals with respect to the communication terminals with almost identical directivities. This can reduce cross-correlation interference from other channels during reception of the respective communication terminals.

The scramble code assignment controlling step of the radio communication method above of the present invention assigns the same scramble code as the scramble code set in channels carrying out transmission with no directivity to a group to which the most communication terminals belong.

This method can reduce cross-correlation interference from other channels for as many communication terminals as possible.

As described above, the radio base station apparatus and radio communication method of the present invention assigns a same scramble code to channels with similar (not necessarily completely the same) directivities in a system that applies transmission with controlled directivity on the downlink (adaptive array antenna), which makes it possible to improve orthogonality among a plurality of channel codes in a same direction and reduce cross-correlation interference from other channels during reception from communication terminals.

This application is based on the Japanese Patent Application No. HEI 11-349465 filed on Dec. 8, 1999, entire content of which is expressly incorporated by reference herein.

INDUSTRIAL APPLICABILITY

The present invention is applicable to a radio base station apparatus and radio communication method in a digital radio communication system.

What is claimed is:

1. A radio base station apparatus comprising:
  an estimation section that estimates arrival directions of receiving signals from a plurality of communication terminals;
  a group dividing section that divides the plurality of communication terminals into a plurality of groups based on the estimated arrival directions of the receiving signals;
  an assignment control section that assigns a same scramble code to all communication terminals belonging under a same group;
  a calculation section that calculates a transmission weight to perform directional transmission to the plurality of communication terminals; and a directional transmission section that directionally transmits a transmission signal modulated with the assigned scramble code, using the calculated transmission weight, wherein:
    said calculation section calculates the transmission weight that is common to all the communication terminals belonging under the same group; and
    said directional transmission section performs transmission with a same directivity to all the communication terminals belonging under the same group.

2. The radio base station apparatus according to claim 1, further comprising a non-directional transmission section that transmits a control channel signal with no directivity, wherein said assignment control section assigns the same scramble code to the control channel signal and at least one group of the plurality of groups.

3. The radio base station apparatus according to claim 1, wherein said assignment control section assigns the same scramble code to the control channel signal and a group with a greatest number of communication terminals.

4. The radio base station apparatus according to claim 1, wherein said assignment control section assigns different scramble codes to the plurality of groups when there is a shortage of the scramble codes, and assigns the same scramble code to the plurality of groups when there is no shortage of the scramble codes.

5. The radio base station apparatus according to claim 1, wherein said group dividing section regroups the plurality of communication terminals based on code resource information.

6. The radio base station apparatus according to claim 1, further comprising a reception section that directionally receives the receiving signals based on the estimated arrival directions of the receiving signals.

7. The radio base station apparatus according to claim 1, wherein said assignment control section changes a scramble code assignment control based on code resource information.

8. The radio base station apparatus according to claim 1, further comprising:
    a notification section that notifies a communication terminal moving across the plurality of groups that the scramble code will change; and
    a changeover timing control section that controls a timing to change the scramble code, wherein:
        at the controlled changeover timing, said assignment control section assigns to the communication terminal moving across the plurality of groups the same scramble code assigned to a group into which said communication terminal moves.

9. A radio communication method comprising the steps of:
    estimating arrival directions of receiving signals from a plurality of communication terminals;
    dividing the plurality of communication terminals into a plurality of groups based on the estimated arrival directions of the receiving signals;
    assigning a same scramble code to all communication terminals belonging under a same group;
    calculating a transmission weight to perform directional transmission to the plurality of communication terminals; and
    directionally transmitting a transmission signal modulated with the assigned scramble code, using the calculated transmission weight, wherein:
        in the transmission weight calculation step, the calculated transmission weight is common to all the communication terminals belonging under the same group; and
        in the directional transmission step, transmission is performed with a same directivity to all the communication terminals belonging under the same group.

* * * * *